United States Patent

[11] 3,554,537

[72] Inventor Edward H. Phillips
 108 King George Road, Bound Brook, N.J. 08805
[21] Appl. No. 761,428
[22] Filed Sept. 23, 1968
[45] Patented Jan. 12, 1971

[54] TEMPLATE PROJECTED IMAGES REFLECTED AND COLORED BY ASYMMETRICAL BODIES EACH HAVING AN OPTICAL REFLECTING LENS
 16 Claims, 4 Drawing Figs.
[52] U.S. Cl. .................................................. 272/10, 350/293
[51] Int. Cl. ..................................................... A63j 5/00
[50] Field of Search ......................................... 272/10, 8, 8(M), 8(D), 8(P); 84/464; 350/271, 273, 266, 269; 356/164, 165, 168; 40/70, 70(A), 71, 68, 68.4

[56] References Cited
UNITED STATES PATENTS
| 2,411,804 | 11/1946 | Plebanek | 272/8(P)UX |
| 2,619,870 | 12/1952 | Torricelli | 40/70X |
| 2,677,297 | 5/1954 | Wetzel | 84/464 |
| 2,858,731 | 11/1958 | Rehorn | 40/70(A)X |
| 2,959,094 | 11/1960 | Kosma | 272/10X |
| 3,318,187 | 5/1967 | Prohaska | 272/8(P)UX |

Primary Examiner—Anton O. Oechsle
Assistant Examiner—Arnold W. Kramer
Attorney—Shoemaker & Mattare ABSTRACT: A source of light is provided, and a template having a plurality of shaped holes formed therethrough is disposed adjacent the source of light. A control means is provided for selecting which one of the shaped holes of the template means is disposed adjacent the source of light. The light beam passing through the template means is adapted to impinge upon a plurality of reflecting lens means mounted on a movable support. Each of these reflecting means includes a curved optical surface for reflecting an image onto one or more surfaces. Each of the lenses includes means for determining the color reflected from the lens means. The lens means includes asymmetrical bodies which tend to cant the lens means for random orientation of the various individual reflecting lens means.

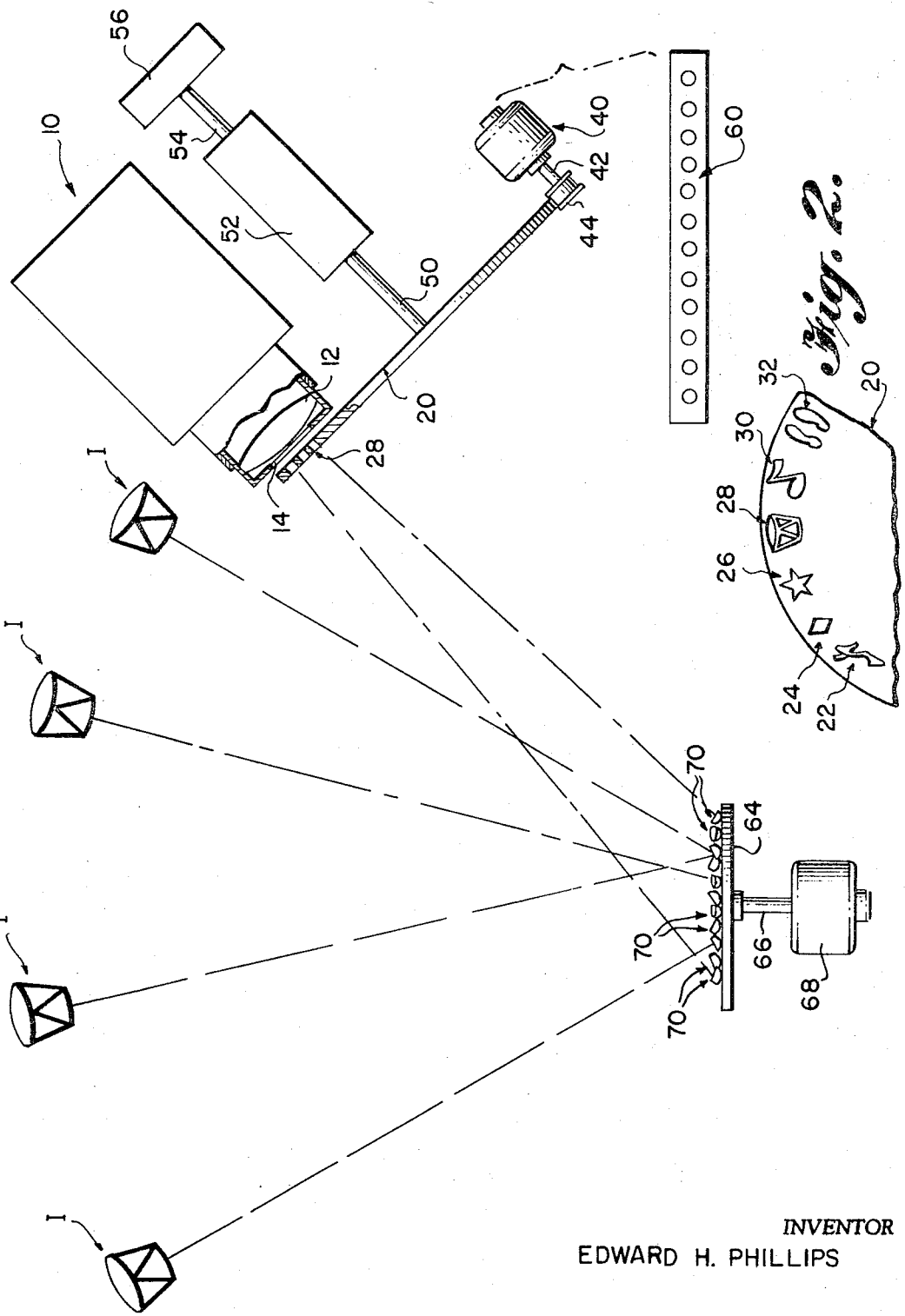

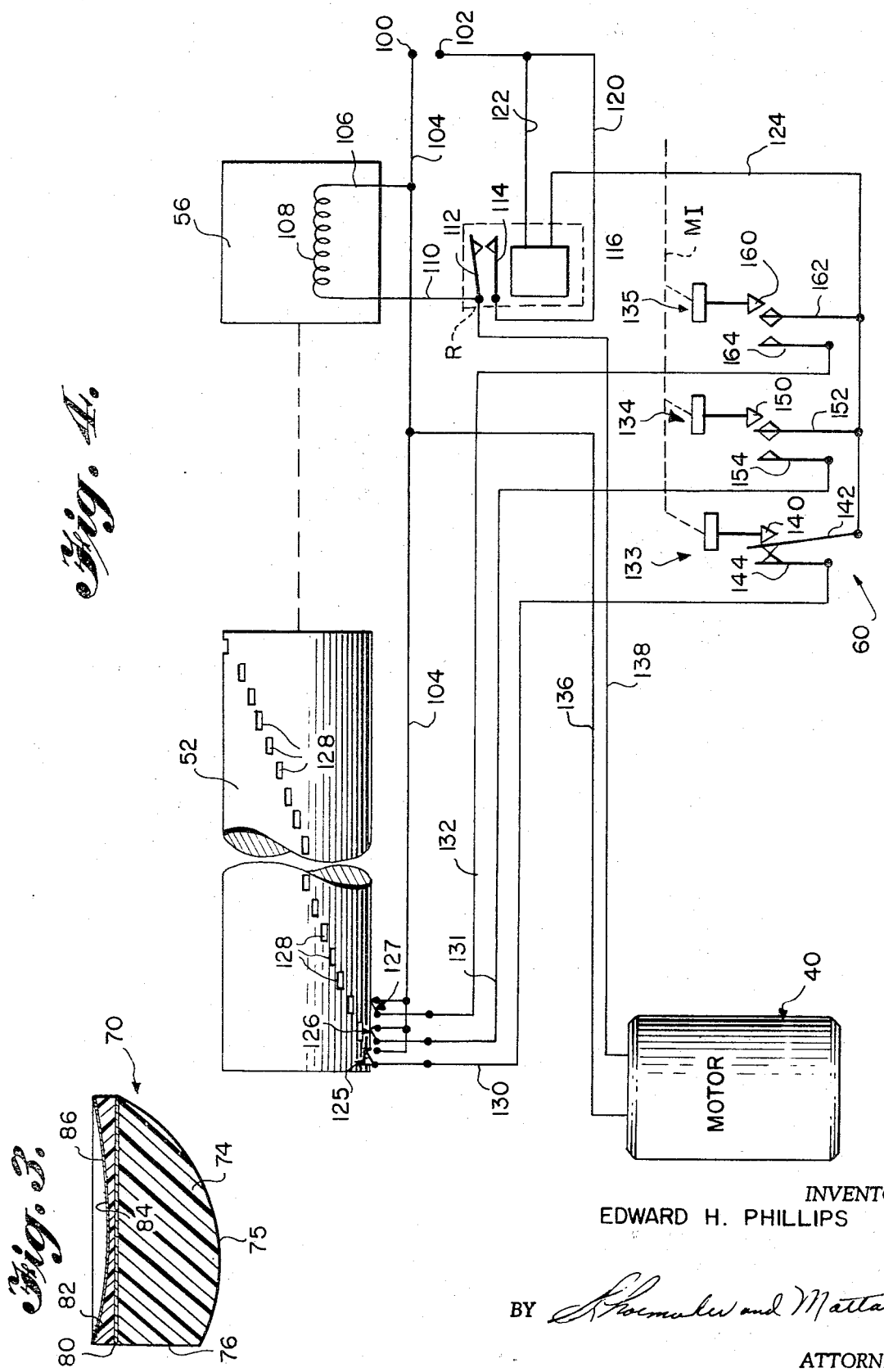

3,554,537

TEMPLATE PROJECTED IMAGES REFLECTED AND COLORED BY ASYMMETRICAL BODIES EACH HAVING AN OPTICAL REFLECTING LENS

BACKGROUND OF THE INVENTION

The present invention relates to entertainment apparatus adapted to provide a visual display in structures or rooms of any size and to project moving images onto surfaces such as the roof, walls and even the floor of a room or the like.

It is the purpose of the present invention to provide apparatus which projects images which continuously move along a surface. It is of course desirable that such images be clearly and sharply focused. In the prior art, devices similar to that of the present invention have not provided images which are sufficiently clear and sharply focused, and additionally such images have not been of sufficient brightness.

It is additionally desirable to provide an arrangement wherein the particular image being projected can be quickly changed, and furthermore wherein a great variety of images may be selected as desired. Entertainment devices of this type of known construction have not provided a means for readily changing the projected images. It is further desirable to provide images of different colors so as to obtain very dramatic and beautiful effects.

I is especially important to provide an arrangement wherein sharply defined images can be projected in rooms of widely varying size, and prior art constructions have not enabled this objective to be attained.

SUMMARY OF THE INVENTION

In the present invention, a light source is provided, and a movable template in the form of a disc having a plurality of shaped holes formed therethrough is mounted adjacent to the light source. The light beam passing through this template will have the configuration of the hole in the template thereby enabling various shaped images to be reflected from the reflecting lens means of the apparatus.

A control means is provided for very accurately positioning the template with respect to the source of light so that any one of a plurality of holes formed through the template can be properly positioned intermediate the light source and the reflecting lens means.

A plurality of reflecting lenses are mounted upon a support means which is adapted to move so that the images reflected from the lens means will move along the surfaces upon which the images are projected.

Each of the lens means includes a curved ground optical surface which is adapted to reflect and sharply focus an image upon a suitable surface. In this manner, a plurality of similar images will be reflected from the various lenses. The lenses also incorporate means for determining the color reflected thereby so that images of different colors may be reflected from various lens means.

With the present invention, bright and clearly defined reflected images may be projected in rooms of various sizes, the images being of different colors. The apparatus further provides a drive mechanism and control circuit for quickly and easily remotely altering the shape of the images as desired.

The reflected images of the present invention may also be supported upon a suitable surface which is agitated by a transducer means connected with a source of sound so that the reflected images will move in unison with music produced by the source of sound.

BRIEF DESCRIPTION OF THE DRAWINGS

FIG. 1 is a somewhat schematic overall view of the entertainment apparatus of the present invention;

FIG. 2 is a fragmentary view of a portion of the template means shown in FIG. 1;

FIG. 3 is an enlarged cross-sectional view of one of the reflecting lens means; and FIG. 4 is a schematic wiring diagram of the control circuit of the present invention.

DESCRIPTION OF THE PREFERRED EMBODIMENT

Referring now to FIG. 1 of the drawings, a conventional light source is indicated generally by reference numeral 10 which may be a common type of projector mechanism, a lens 12 being provided adjacent an aperture 14 formed at one end thereof. The source of light is adapted to provide a light beam directed downwardly as seen in FIG. 1 and adapted to impinge upon a disc-shaped template means indicated by reference numeral 20.

As seen in FIG. 2, a portion of the periphery of the template means is illustrated. A plurality of shaped holes are formed through the template means adjacent to the periphery thereof, and as seen in FIG. 2, a hole 22 is in the shape of a slipper, a hole 24 is in the shape of a diamond, a hole 26 is in the shape of a star, a hole 28 is in the shape of a drum, a hole 30 is in the shape of a musical note, and a hole 32 is in the shape of a pair of feet. It is apparent that a relatively large number of these holes may be provided through the template means and that the holes may be of widely different shape to provide the desired aesthetic effect. As seen in FIG. 1, the drum-shaped hole 28 is disposed adjacent the source of light so that the light beam from the source of light will pass through hole 28 to provide a light beam directed in a downward direction having a cross-sectional configuration of a drum.

Means for remotely controlling and accurately positioning the position of the template means with respect to the source of light includes an electric motor 40 having an output shaft 42 upon which is mounted a friction drive wheel 44. This drive wheel is in engagement with the outer edge of the template means 20. It is apparent that when motor 40 is energized, the drive wheel 44 will rotate the template means.

The template means is interconnected with a shaft 50 which is suitably journaled for rotation about the axis thereof. This shaft 50 is interconnected with a generally cylindrical drum the details of which will be more fully described hereinafter. This drum 52 is in turn connected with a shaft 54 which is operatively associated with a brake means indicated by reference numeral 56. This brake means may be of any conventional construction and is spring applied and electrically released upon energization of a brake coil hereinafter described.

A remote control means is indicated generally by reference numeral 60 and includes a panel or the like having a plurality of selecting switch means which are hereinafter described.

A support means 64 comprises a generally circular plate which is interconnected with a shaft 66. This shaft in turn is connected with an electric motor 68 which in a typical example may comprise a one-half revolution per minute motor which is continuously driven during the operation of the apparatus. This will cause the reflecting lens means 70 supported on the upper surface of the support means 64 to be slowly moved during operation of the apparatus.

The reflecting lens means 70 may be randomly disposed on the support means, and in any event, the lens means are disposed in different orientations with respect to one another so that they will reflect images in different directions. The reflected images are indicated by reference characters I in FIG. 1, and it is apparent that such images may be reflected in many different directions upon a ceiling, walls or even on the floor of a room and the like.

Referring now to FIG. 3, the details of an individual reflecting lens means of the present invention are illustrated. The base portion of each of the lens means includes a body 74 which may be formed of a suitable transparent substance such as lucite plastic or the like. This body of material includes an arcuate undersurface 75, and a flat side surface 76. With this construction, the overall lens means is of a nonsymmetrical relationship so that when placed freely on a supporting surface it will tend to be disposed in a canted position whereby a random orientation of the various individual reflecting lens means is attained.

A layer of a suitable bonding means such as rubber, glue or the like 80 is disposed on the upper surface of the body 74 of the reflecting lens means and serves to secure a member 82 formed of optical glass in place. This member 82 includes a curved optically ground reflecting surface 84 which is ground so as to form a lens which is adapted to sharply focus an image reflected therefrom on a suitable surface. It is apparent that the lens may be ground in order to provide different focal lengths in accordance with the size of the room within the apparatus is to be employed.

In order to provide color selectivity so that only certain colors will be reflected from particular lenses, the ground surface 84 is provided with a thin film 86 which may comprise a multilayer high-efficiency interference film utilizing the phenomenon of optical interference at the boundary of material of high and low index of refraction so as to reflect certain colors. This film may be deposited by evaporation under a high vacuum, and very satisfactory results are obtained with this construction. Typical films which may be employed with the lens means of the present invention are manufactured by Fish-Schurman Corporation, New Rochelle, New York.

Referring now to FIG. 4 of the drawings, the electrical network which controls the operation and positioning of the template means is illustrated. A pair of terminals 100 and 102 are interconnected with a suitable source of electrical current such as 110volts AC Terminal 100 is connected with a lead 104 which in turn is connected through a lead 106 with the coil 108 of the brake 56 previously described. The opposite end of this coil is connected by lead 110 with a contact 112 of a relay R. The relay includes a second contact 114 and a coil 116. The contact 114 is connected by lead 120 with the opposite terminal 102. A lead 122 connects the coil of the relay with terminal 102, the coil also being connected by a lead 124 with the control means 60, this control means including a plurality of selecting switch means hereinafter described.

Lead 104 is connected in parallel with a plurality of drum switches 125, 126 and 127, only three of such switches being illustrated. It should be understood that a drum switch will be provided for each of the different holes formed through the template means so that any one of these holes can be selected. These drum switches are normally held in the closed position by the outer periphery of drum 52. The drum includes a plurality of holes 128 disposed in staggered relationship therearound, these holes being adapted to align with different ones of the drum switches at different positions of rotation of the drum with respect to the drum switches. In the position illustrated, switch 125 is in the open position, while switches 126 and 127 are held in the closed position as would all of the remaining drum switches which have not been shown for the sake of clarity.

Switches 125, 126 and 127 are connected by leads 130, 131 and 132 respectively with selecting switch means 133, 134 and 135, these selecting switch means comprising conventional pushbutton switches. The selecting switch means are interconnected by a conventional mechanical interlock mechanism indicated by reference character MI so that only one of the pushbutton switches may be operated at any particular time in a well known manner.

A lead 136 connects lead 104 with one side of the electric motor 40, the opposite side of the electric motor is connected by a lead 138 with the contact 112 of the relay previously described.

Pushbutton switch 133 includes a lower cam member 140 adapted to engage a movable contact 142 for engaging a fixed contact 144 connected with lead 130.

Pushbutton 134 includes a lower cam member 150 adapted to move a movable contact 152 into engagement with a fixed contact 154 connected with lead 131. Pushbutton 135 includes a lower cam member 160 adapted to urge a movable contact 162 into engagement with a fixed contact 164 which in turn is connected with lead 132.

The various pushbutton switches are normally disposed in the open position and are closed when the associated pushbutton is depressed in a well known manner.

When it is desired to selectively control the position of the template means so as to position a particular hole formed therethrough adjacent to the light source and intermediate the light source and the reflecting lens means, one of the pushbuttons 133, 134 and 135 etc. may be pushed downwardly. Assuming that the drum 52 is in a position other than that illustrated, the drum switch 125 would be closed. Accordingly, when pushbutton 133 is depressed, the circuit is closed through the relay R thereby closing contacts 112 and 114. This causes the brake coil 108 to be energized so as to release the brake holding the drum and the template in place, and simultaneously, the circuit will be closed through the motor 40 so as to energize the motor thereby causing the template means to be rotated.

The template means will be rotated until the drum 52 reaches the position shown in FIG. 4. In this position, one of the holes 128 on the drum is aligned with the drum switch 125. When the hole is so aligned, the drum switch 125 will open. When this switch opens, the circuit through the relay coil is broken allowing the relay contacts 112 and 114 to open. This will cause the motor to be deenergized as well as the brake coil 108 thereby permitting the brake to be reset by its spring actuating means.

In this manner, it is apparent that the control circuit serves to remotely select and accurately position the template means upon actuation of one of the selecting switch means.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Entertainment apparatus comprising a source of light, a plurality of reflecting lens means disposed remote from said source of light, template means between said source of light and said reflecting lens means, each said reflecting lens means including an asymmetrical body, an optical reflecting lens on said body for reflecting and focusing a clear and sharp template image on a surface, and color selective film means on said lens means for coloration of said reflected image.

2. Apparatus as defined in claim 1 including support means for supporting said reflecting lens means and means for moving said support means.

3. Apparatus as defined in claim 2 wherein said support means includes a substantially flat upper surface, and said means for moving the support means serving to rotate the support means.

4. Apparatus as defined in claim 1 wherein said template means comprises a flattened means having a plurality of shaped holes formed therethrough.

5. Apparatus as defined in claim 4 including drive means for moving said template means with respect to said source of light for moving different ones of said shaped holes into place adjacent said source of light.

6. Apparatus as defined in claim 5 including selective control means for operating the drive means to thereby select a particular shaped hole of said template means to be disposed adjacent the source of light and intermediate said source and said reflecting lens means.

7. Apparatus as defined in claim 1 wherein said plurality of reflecting lens means are disposed in spaced relationship to one another.

8. Apparatus as defined in claim 7 wherein said plurality of lens means are disposed in different orientations with respect to the source of light so as to reflect images in different directions.

9. Apparatus as defined in claim 1 wherein said plurality of reflecting lens means include different color selective film means for reflecting certain colors whereby images of different color are reflected by said lens means.

10. Apparatus as defined in claim 1 wherein said reflecting lens means includes a curved optical reflecting surface for providing a sharply focused image on a surface.

11. Apparatus as defined in claim 1 wherein each of said lens means has an arcuate undersurface.

12. Apparatus as defined in claim 1 wherein said template means has a plurality of shaped holes formed therethrough, control means for selecting the position of said template means with respect to said source of light so as to interpose different ones of said shaped holes between said source of light and said reflecting lens means, said control means including an electrical network comprising an electric motor drivingly operatively connected with said template means, and selecting switch means for determining the operation of said electric motor to select the position of said template means.

13. Entertainment apparatus comprising a source of light, template means disposed adjacent said source of light, reflecting lens means remote from said source for reflecting images onto one or more surfaces, said template means having a plurality of shaped holes formed therethrough, and control means for selecting the position of said template means with respect to said source of light so as to interpose different ones of said shaped holes between said source of light and said reflecting lens means, to form said images said control means including an electrical network comprising an electric motor drivingly operatively connected with said template means, selecting switch means for determining the operation of said electric motor to select the position of said template means, a generally cylindrical drum operatively connected to said template means and driven thereby, said drum having spaced holes formed therein, and a plurality of normally closed drum switches operatively associated with said drum and said selecting switch means; said switches being opened when aligned with an associated hole in said drum and means including said switches for interrupting movement of said drum and said template means upon said switch being opened to stop one of said shaped holes in said template means in a predetermined position relative to said light source.

14. Apparatus as defined in claim 13 including brake means for said drum, said brake means being normally mechanically applied and electrically released.

15. Entertainment apparatus comprising a source of light, template means disposed adjacent said source of light, reflecting lens means remote from said source for reflecting images onto one or more surfaces, said template means having a plurality of shaped holes formed therethrough, and control means for selecting the position of said template means with respect of said source of light so as to interpose different ones of said shaped holes between said source of light and said reflecting lens means to form said images, said control means including an electrical network comprising an electric motor drivingly operatively connected with said template means, selecting switch means for determining the operation of said electric motor to select the position of said template means, said selecting switch means including a plurality of switches, and mechanical interlock means connected between said plurality of switches so as to prevent more than one switch from being actuated at any particular time.

16. Entertainment apparatus comprising a source of light, template means disposed adjacent said source of light, reflecting lens means remote from said source for reflecting images onto one or more surfaces, said template means having a plurality of shaped holes formed therethrough, and control means for selecting the position of said template means with respect to said source of light so as to interpose different ones of said shaped holes between said source of light and said reflecting lens means to form said images, said control means including an electrical network comprising an electric motor drivingly operatively connected with said template means, selecting switch means for determining the operation of said electric motor to select the position of said template means, a brake operatively connected with said template means, and relay means in said electrical network for simultaneously energizing said electric motor and deenergizing said brake.